United States Patent [19]

Bencic

[11] 4,203,421
[45] May 20, 1980

[54] SOLAR HEAT COLLECTOR

[76] Inventor: David M. Bencic, 2731 Galloway Rd., Batavia, N.Y. 14020

[21] Appl. No.: 831,423

[22] Filed: Sep. 8, 1977

[51] Int. Cl.² .......................... F24J 3/02; F28F 3/14
[52] U.S. Cl. .................................. 126/444; 165/170; 126/446; 126/449
[58] Field of Search ............... 126/270, 271; 237/1 A; 29/157.3 D, 157.3 H; 165/168, 170

[56] References Cited

U.S. PATENT DOCUMENTS

| | | | |
|---|---|---|---|
| 2,156,544 | 5/1939 | Raskin | 165/170 X |
| 2,158,383 | 5/1939 | Saunders | 165/170 X |
| 2,342,062 | 2/1944 | Schenk | 126/271 |
| 2,991,543 | 7/1961 | Heuer et al. | 165/168 X |
| 3,146,774 | 9/1964 | Yellott | 126/271 |
| 3,990,429 | 11/1976 | Mazzoni et al. | 126/271 |
| 3,991,742 | 11/1976 | Gerber | 126/271 |
| 4,036,209 | 7/1977 | Press | 126/271 |
| 4,056,090 | 11/1977 | Henriques et al. | 126/271 |
| 4,076,024 | 2/1978 | Banet | 126/271 |

FOREIGN PATENT DOCUMENTS 28273 of 1912 United Kingdom ..................... 126/271

*Primary Examiner*—Samuel Scott
*Assistant Examiner*—Larry Jones
*Attorney, Agent, or Firm*—Raymond F. Kramer

[57] ABSTRACT

A solar heat collector, suitable for installation in inclined position to face the sun, as on a sloped roof, includes at least one flexible, usually substantially flat, wall member and a conforming second wall member, preferably with both wall members being of thin conductive metal, such as used aluminum printing plates, with both walls being spaced part to form passageways for the flow therethrough of a heat transfer fluid under a vacuum so that the walls are pressed toward each other. To allow flow of heat transfer fluid through the solar heat collector panel without obstruction because of the vacuum one or both walls may be formed into channel shapes or the collector may include a spacing and/or rigidifying screen or equivalent between the walls, highly preferably with the panels being indented or shaped to conform with openings in the screen, thereby helping to position the screen and to improve heat transfer. The wall members usually communicate with a plurality of manifolds to facilitate circulation of the heat transfer fluid through the solar heat collector. The external face of the wall facing the sun may be black, or such wall may be transparent and the interior of the other wall may be black; alternatively, the first wall may be transparent (or less desirably, translucent) and the heat transfer fluid may be dark colored, preferably black, to promote heat absorption.

Also described are solar heating installations including pumps for circulating a heat transfer fluid through the collector and means, which may include, in part at least, the mentioned pumps, for drawing a vacuum in the interior of the collector. The use of vacuum, in conjunction with channels in the collector walls or screening or other spacing and shaping material between the walls which wall surfaces may conform to openings in such screening or other such material, promotes better thermal contacts so as to improve efficiency of the solar heat collector and the heating installation and also helps to rigidify the collector.

21 Claims, 12 Drawing Figures

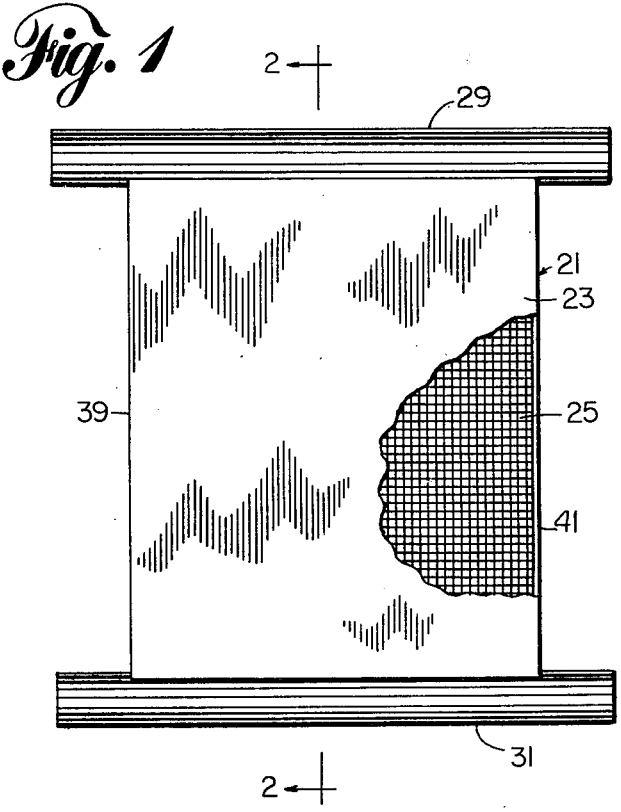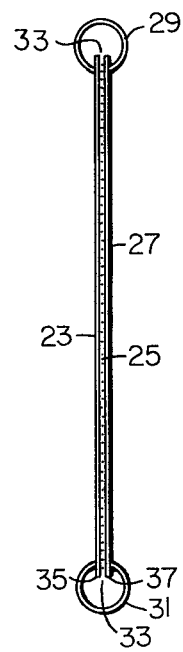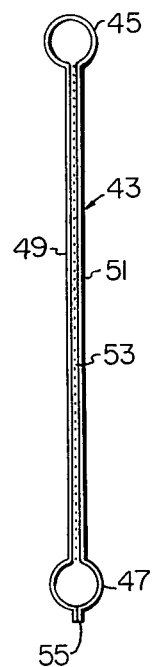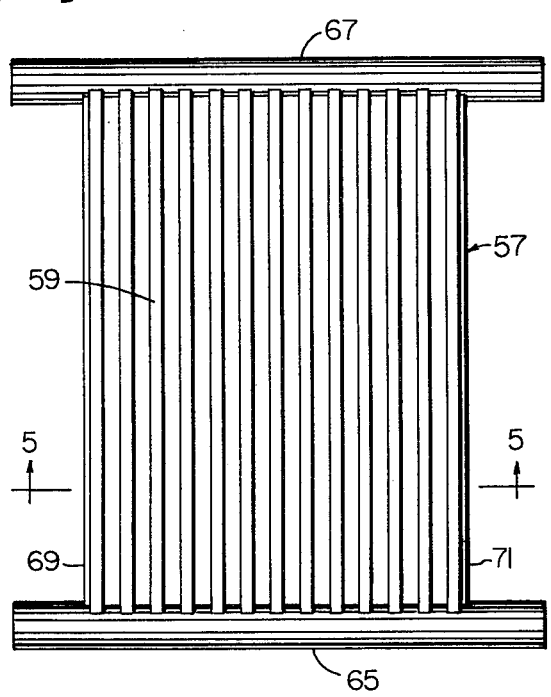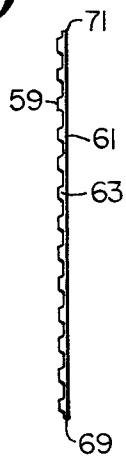

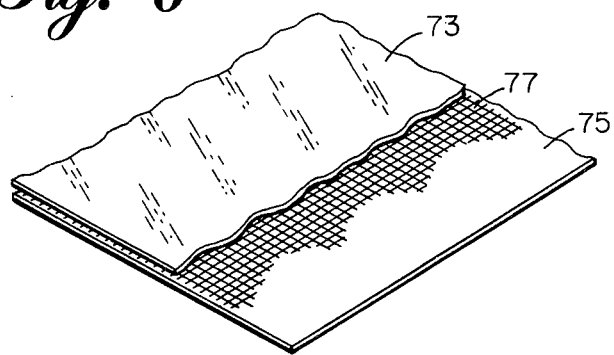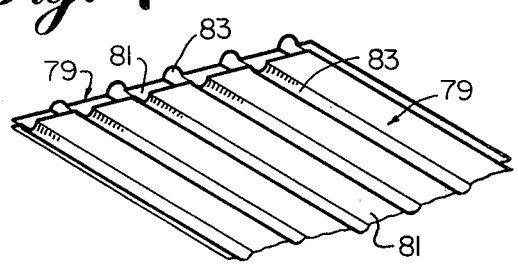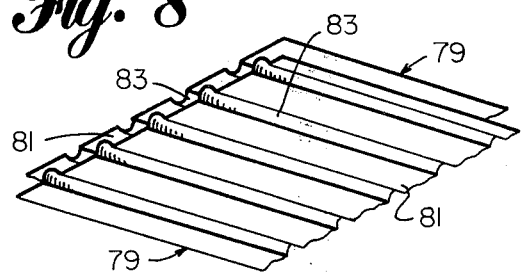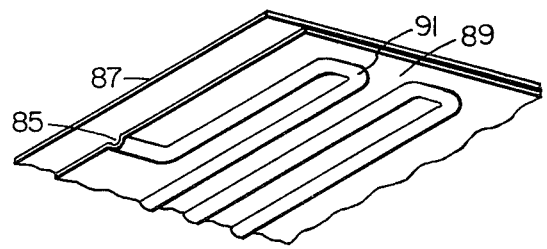

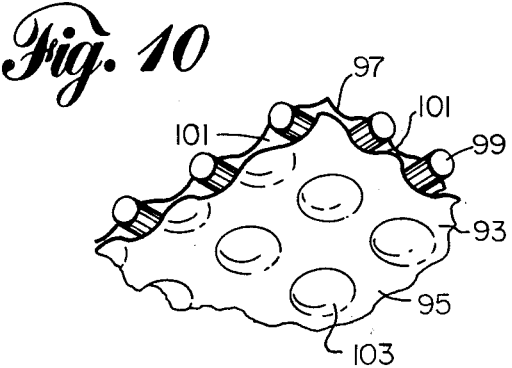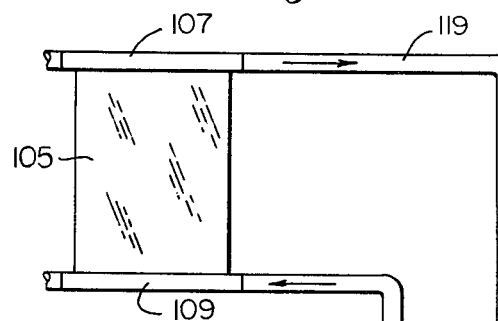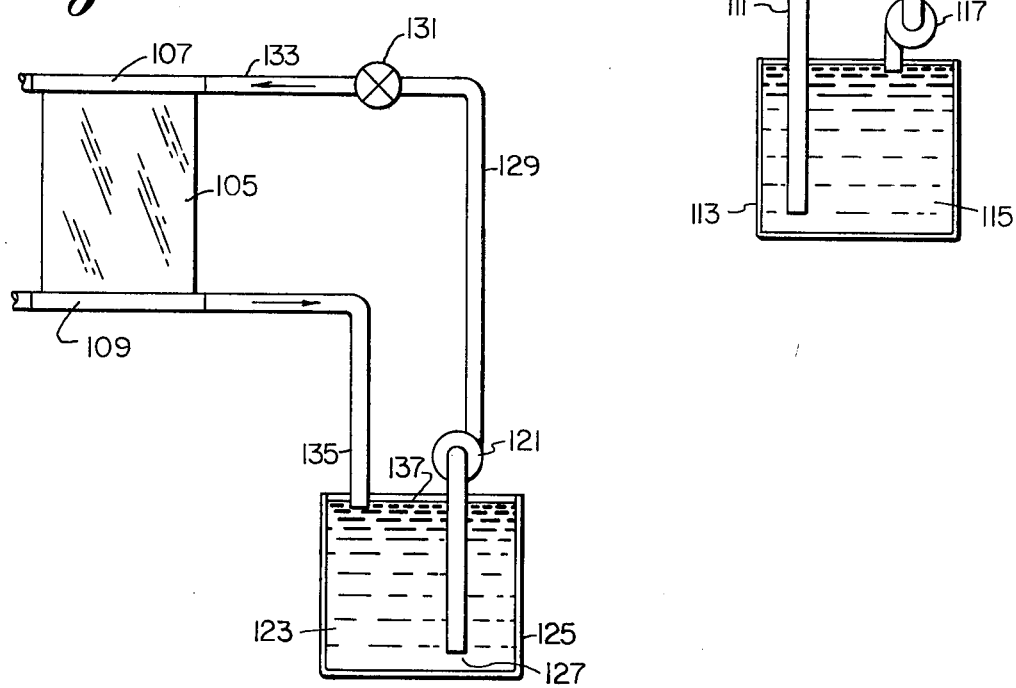

SOLAR HEAT COLLECTOR

This invention relates to a solar heat collector. More particularly, it relates to such a collector which is substantially a panel shape and with a major surface thereof facing the sun to absorb its rays, which includes means for circulating heat transfer fluid through the collector in improved thermal contact with it due to imposition of an internal vacuum so as to improve the heating of the heat transfer fluid, with means for transporting the heat transfer fluid to a location remote from the collector. The invention also relates to solar heating installations wherein the collector is in position facing the sun and vacuum is maintained on the interior thereof so as to promote improved thermal contact of the heat transfer medium with the panel parts and to help to rigidify the relatively thin walled panels, which are employed to promote better heat transfer, to lower the weight of the units and to minimize expense.

Because of the fossil fuels shortage and the dramatic increases in prices of such fuels in recent years extensive efforts have been undertaken to utilize non-fossil fuel sources of energy. Solar energy has been concentrated by lenses and mirrors and has been converted directly to electricity by solar batteries. In some such installations the heat absorbing or concentrating parts have automatically tracked the sun. Heat transfer fluids have been circulated through piping installed in panels and located on house tops or slanted roofs facing the sun for at least a portion of the day, preferably about noontime. Generally, solar heaters for installation on house tops or roofs are comparatively flat and panel-shaped and include means for circulating heat transfer fluid through the heater to extract heat absorbed by the heater (or the fluid therein) from the sun, and to transfer such heat elsewhere, as to a hot water or hot air heating system or a hot water tank. U.S. Pat. No. 2,998,005 is for a solar heater including a glass fiber mat for absorbing heat from the sun, which heat is removed from the mat in a gas by a blower and which is conveyed in the gas to a point of use. In U.S. Pat. No. 3,102,532 slit and expanded metal foil in the interior of a heating panel absorbs heat from the sun's rays (which initially pass through a transparent panel wall) and aids in transferring such heat to a circulating fluid (air). U.S. Pat. No. 3,254,643 includes a corrugated or mesh material used to absorb solar heat and heat a liquid circulated through the panel by a pump. In U.S. Pat. No. 3,387,602 spreading means are included within a heating panel for distributing the circulating heat transfer fluid. In both this patent and U.S. Pat. No. 3,254,643 a wall of the panel facing the sun is transparent. U.S. Pat. No. 3,987,784 illustrates a plurality of parallel tubes in a solar energy absorber panel, which are connected to manifolds at both ends thereof. Similar constructions are shown in U.S. Pat. Nos. 3,990,429 and 4,010,733 and in defensive publication T952,004.

Although the citations of relevant U.S. patent art given above indicate that there have been manufactured and suggested as suitable solar energy collectors comparatively thin panels, suitable for installation on slanted roofs and including manifolds at top and bottom thereof, with intermediate passageways in good thermal contact with a heat absorbing wall, through which manifolds and panel passageways heat transfer fluid circulates, none of the references known to applicant teaches or suggests important aspects of his invention. Thus, none shows the use of thin, flexible (and distortable) heat conductive wall members for panels which are pressed together against each other, if channeled, or against an intermediate heat conductive screen or equivalent by a gas pressure which promotes thermal contact therewith, rigidifies the collector walls and improves heat transfer. No reference teaches the use of external air pressure and an internal vacuum to promote pressing together of the wall members. None of the references discloses the utilization of waste material such as applicant's aluminum printing plates or sheets and the improved adherence of heat absorbing black paint on certain surfaces thereof. Additionally, none shows applicant's solar heating installation, which includes pumping means for circulating heat transfer fluid (liquid) through the system and for drawing a vacuum on the collector panel walls.

In accordance with the invention a solar heat collector comprises a thin flexible first wall member, a second wall member comforming in shape to said first member, forming with it major walls of the solar heat collector and spaced apart from it so as to form at least one passageway for flow therethrough of a heat transfer fluid, said first wall being such as to be held in position, pressing at least in part in the direction of the second wall, by an external fluid pressure pressing against the first wall to create a pressure difference between the exterior of the first wall and the passageway interior, preferably being about 0.1 to 0.5 kilogram per square centimeter. Such collector very desirably includes spacing material between the major walls thereof in passageways for the fluid, with the spacing material having openings therein and with the wall members, or at least one such wall member, conforming in shape with the spacing material, as by having depressions thereof matching open spacing areas.

The invention will be readily understood by reference to this entire specification, especially the following description, taken in conjunction with the drawing, in which:

FIG. 1 is a partially cut away side elevation of a solar heat collector of this invention, taken normal to major surfaces thereof;

FIG. 2 is a sectional elevation along plane 2—2 of FIG. 1;

FIG. 3 is sectional elevation, corresponding to that of FIG. 1, of a modified solar heat collector of this invention;

FIG. 4 is a side elevational view of another solar heat collector of this invention;

FIG. 5 is a sectional plan view along plane 5—5 of FIG. 4;

FIG. 6 is a partially cut away fragmentary perspective view of wall and interior portions of another solar heat collector of this invention;

FIG. 7 is a fragmentary perspective view of walls and channels of a different solar heat collector of this invention;

FIG. 8 is a fragmentary perspective view of walls and channels of a modified solar heat collector of this invention, utilizing the same parts as shown in FIG. 7, but assembled differently;

FIG. 9 is a fragmentary perspective view of wall portions of another solar heat collector of this invention;

FIG. 10 is an enlarged fragmentary perspective view of a portion of the walls and internal screening material of a solar heat collector of this invention, like that of FIGS. 1 and 2, with drawing together of the walls at the openings in the screening being illustrated;

FIG. 11 is a schematic side elevation of a solar heating installation of this invention; and FIG. 12 is another schematic view of a different such installation.

In FIG. 1 solar heat collector 21 comprises a heat absorbing thin, flexible black wall member 23, designated the first wall member, an interior woven screen 25, substantially conforming to the first wall member, a second wall member 27 (not shown in FIG. 1 but illustrated in FIG. 2) and a pair of manifolds 29 and 31, communicating with the interior of the solar collector panel between wall members 23 and 27. As is shown in FIG. 2, there is a clearance passageway 33 (or what might be termed a plurality of such passageways) between the interiors of the first and second wall members, which are kept apart by the presence of the woven wire mesh spacer (and conductor and rigidifier) 25. Normally a fluid heat transfer medium, which is a fluid under normal conditions and often preferably is fluid under abnormal conditions, such as winter cold, is present in manifolds 29 and 31 and is passageway(s) 33 and such is maintained under vacuum in said passageway(s) so as to act to draw together first and second walls 23 and 27 and promote better thermal contacts of said walls with the mesh of spacer 25 and with the heat transfer fluid in the collector panel.

At the ends 35 and 37 of first and second wall members 23 and 27 they will be welded, soldered or otherwise sealingly fastened to manifold or header 31 and similarly the first and second wall members will be fastened to manifold 29 and also will be fastened together at ends 39 and 41 thereof. However, it is within the invention to utilize crimping, cementing, caulking, painting, vulcanizing, polymerization and various other suitable means and techniques for sealing off said ends and for sealing the wall members to the manifolds. Manifolds 29 and 31 are also preferably made so that they are readily adapted for connection to piping, tubing, vacuum and pressure resistant hoses and other means for conducting heat transfer fluid to and from the solar heat collector panel.

Materials of construction for the described unit of FIGS. 1 and 2 may be thin, flexible metal sheets but such thin flexible sheets may also be of synthetic polymeric plastic, preferably a polyether or polyester which is reinforced with glass filaments, glass, rubber and even wood, although heat conductive metals are highly preferred. Most preferred and ideal for use in the present panels are used newspaper or magazine printing plates, such as those of aluminum on which the newspaper makeup has been etched (the print areas hold ink and transfer it to a printing roll from which the paper is printed). Such aluminum is usually of desirable thickness for employment in the present invention, often being about 0.1 to 0.3 mm. thick, and the etched side thereof furnishes a good base for painting, it being desirable to paint one major wall surface black to absorb the solar heat better. It is contemplated that aluminum thicknesses from 0.1 to 0.6 mm. are useful, being sufficiently flexible to be moved by an internal vacuum in the described collector panels and being strong enough so as not to fail under such vacuum, e.g., one of 0.03 to 1 kg./sq. cm., preferably 0.1 to 0.5 kg./sq. cm., absolute pressure, internally, with normal external atmospheric pressure, when brought into contact with internal spacers. The plates are comparatively inexpensive (are waste materials for the most part, are often only useful for salvage purposes and may represent a disposal problem) and are often of ideal size for employment directly without waste in the manufacture of the present solar heat panels. Thus, in one embodiment the plates are about 0.9 meter by 0.6 meter by 0.22 mm. Although the aluminum printing plates described are highly preferred materials for use in making the present solar heat collector wall members or at least one such wall member, the use of copper, which is highly thermally conductive, is also favored. While silver is an excellent conductor too, the cost thereof is usually prohibitive. Instead of woven screening of the type shown in the interior of the heat collector panel, which is preferably about 0.2 to 5 mm. thick, being made from wire which is usually of a diameter or effective diameter of about 0.1 to 0.5 mm., equivalent spacing, flow interrupting, thermally conductive and rigidifying structures may be utilized, such as expanded metals, non-woven cloth made from various types of wires and filaments, tubes, etc. The main consideration is that these be sufficiently strong to withstand the compacting forces of the panel wall members under vacuum so as to maintain passageways through the panel from one manifold to another (or from inlet to outlet) and desirably also the spacers will be sufficiently conductive so as to improve the rate of heat transfer from the portion of the panel absorbing the heat to the heat transfer fluid circulating through such panel.

In FIG. 3 is shown a solar heat collector 43 made from one sheet of thin, flexible and conductive material, such as that of walls 23 and 27 of FIGS. 1 and 2. It will be noted that the manifolds 45 and 47 are formed integrally with the walls 49 and 51 about spacer 53 and are joined together by crimping and cementing, with silicone rubber cement, at ends 55. Because a drawback in such structure is that the relatively flexible material of construction may make joinder to connecting piping, tubing or hose difficult or inconvenient, the ends of manifolds 45 and 47 are sometimes desirably reinforced, as by insertion therein of internal piping (not shown) held in place by pipe strapping (not shown).

In FIG. 4 solar heat collector 57 includes wall member 59, formed into a ridged or channeled structure, and wall member 61, (FIG. 5) which is flat. Passageways 63 between the wall members allow the flow of heat transfer fluid through them from manifold 65 to manifold 67 (reverse flow is also possible but upward flow is favored), both of which manifolds are joined in pressure-tight and vacuum-tight relationship with the wall members. Although the wall members may be joined together at various points where they come into contact (such contacts are shown in FIG. 5) this is not necessary and usually is not desirable, it only being important to seal them together at ends 69 and 71, where they may be joined and sealed by cementing, soldering, welding, crimping, fusing, polymerizing or other suitable means or techniques or combinations of any thereof. If desired, additional filling or packing material, like the screen of FIGS. 1-3, may be present in the passageways but such is not necessary, the plurality of small passageways of the solar collector of FIGS. 4 and 5 usually being enough to promote good heat transfer from the absorbing wall to the container heat transfer fluid. Although for ease of cleaning it may be desirable to have the flat surfaced wall facing the sun, with the external surface directed toward the sun being black, reverse positioning is practicable and because of the ribbing structure, when the external wall is clean, may even be capable of absorbing solar energy more effectively. Of course, headers 65 and 67 are so constructed as to be readily adaptable for connection with other such headers, piping, tubing, etc. (for example, as described with respect to the embodiment of FIGS. 1-3), to facilitate ease of making various installations and of effecting repairs, etc.

In FIG. 6 part of a solar collector of a design different from those shown in FIGS. 1-5 is illustrated. Wall 73, facing the sun, is of transparent (preferably) or translucent material, such as glass, and may be rigid or less flexible than flexible wall member 75, which is black on the surface thereof facing the sun to promote better energy absorption. The external air pressure, in conjunction with an internal vacuum, causes wall 75 to press in the direction of wall 73, into thermally conducting contact with intermediate spacing, heat transfer and rigidifying screen 77 or equivalent structure. Although in FIG. 6 a portion of a solar energy collector somewhat resembling that of FIGS. 1-3 is illustrated, the use of a transparent wall member is also possible in a modification of the apparatus of FIGS. 4 and 5, with wall 61 thereof being transparent and the internal surface of ribbed wall 59 being black. Alternatively, when using a transparent wall member, the other wall member need not be black providing that the heat transfer fluid, a liquid in such case, is solar energy absorbent, as by being dyed or pigmented black.

In FIG. 7 wall member 79 has flat walled channels, for the flow of heat transfer fluid, formed between surfaces 81 thereof, with the curved portions 83 bearing against said flat surfaces and acting as spacers. By moving one of the panels transversely with respect to the channel axes differently sized flow channels may be created and by aligning curved spacers 83 channels of twice the volume may be produced. Thus, there is a measure of design flexibility possible, utilizing the present structure, at least with respect to collector thickness and channel cross-sectional area. In FIG. 8 is shown a modification of the portion of the unit of FIG. 7, wherein the walls have been turned 180° so that wall members 79 have flat sections 81 abutting and channels for the flow of heat transfer fluid are created between curved wall portions 83. By moving one of said wall members transversely with respect to the other the number of channels may be increased (doubled) and the cross-sectional area halved, as new channels are formed, defined by flat wall 81 and curved wall 83. Although it is not illustrated, it is to be understood that, as with the embodiments of the invention shown in FIGS. 1-6, the collector wall members will be sealed at the ends thereof and channels will communicate with appropriate headers or other inlets and outlets in pressure-tight and vacuum-tight relationships.

FIG. 9 shows another combination of wall designs to form a passageway, this one a tortuous passageway, wherein a single channel curves back and forth across the heat transfer area of a solar heat collector wall. While it is not illustrated in FIG. 9, which shows only a part of the walls of the solar collector, the passageway 85 between flat wall 87 and wall 89, which includes a serpentine raised portion 91, may communicate on opposing ends of the collector with manifolds or other piping or may have both inlet and outlet to such serpentine channel at the same end. As was previously mentioned with respect to the heat collector of FIGS. 4 and 5, and as is also true of those of FIGS. 7 and 8, the channels of the collector of FIG. 9 may have packing, flow controlling, heat conductive and spacing material therein but such is not necessary and usually is not even desirable, because it adds additional expense without corresponding heat transfer advantages (the heat transfer is very good, even without such packing).

In FIG. 10, showing a part of a modification of the solar heat collector of FIGS. 1 and 2, blackened heat absorbing surface 93 of wall 95 faces the sun, and that wall together with the other such wall 97, forms a solar heat collector, with woven screening 99 between them holding the walls apart as they are pressed together by external atomospheric pressure, due to the presence of a vacuum between them, defining passageways 101 for the heat transfer fluid. When walls 95 and 97 are very thin, such as being 0.1 mm. thick and/or when the internal vacuum between the walls is comparatively high, e.g., 0.3 or more kg./sq. cm., the surfaces of the wall members may be drawn inwardly in the spaces between screen filaments to form concavely dished depressions 103 which serve to hold wall members 95 and 97 firmly in place and improve the rigidity thereof. Alternatively, such depressions may be created by stamping, explosion forming or other suitable techniques. Also, instead of utilizing woven screen spacers, as in FIGS. 3 and 6, and formed channel portions which also act as spacers, as in FIGS. 7 and 8, indentations, like those identified by numeral 103 in FIG. 10 may be employed.

In FIGS. 11 and 12 are shown solar heat collector panels 105, with manifolds 107 and 109 connected in different manners so as to circulate heat transfer fluid through the collectors and create partial vacuums in them, so that external air pressure (or other external fluid pressure) may act to press the collector sides toward each other. Fluid flows are in the directions of the arrows. In FIG. 11 connecting piping 111 communicates with reservoir 113, containing heat transfer fluid 115, and pump 117, communicating with manifold 107 through piping 119, draws the heat transfer fluid through the solar heat collector panel, creating a suitable vacuum therein, determined by the suction created by the pump. In FIG. 12 a reverse setup is shown with pump 121 pumping heat transfer liquid 123 from reservoir 125 via pipe 127 and piping 129 through control valve 131, piping 133 and manifold 107 to the solar heat collector 105, from which it exits via manifold 109 and piping 135 back to reservoir 125. Such an apparatus is carefully controlled so that the drop from the level of manifold 109 (or manifold 107 or any other height of collector 105) to the level 137 of liquid 123 in reservoir 125 is such as to maintain a vacuum (partial vacuum) inside solar heat collector 105. Care should be taken in use of the apparatus of FIG. 12 to have valve 131 so limit the flow of heat transfer fluid through pipe 133 and collector 105 that the siphoning effect of liquid flowing from collector 105 to reservoir 125 is not counteracted by the pump pressure.

The preferred materials of construction of the solar heat collector have been described but various other equivalents may also be employed, such as painted or corrosion resistant steel, brass and even aluminum foil, in selected installations. The material of at least one of the collector walls should have a flexibility similar to that of the metals and plastics already mentioned, so that it may flex under vacuum in the manner previously described. Suitable metals are usually of a modulus of elasticity within the range of 500,000 to 2,000,000 kg./sq. cm. They are preferably acid etched if to be painted black. Instead of using glass for a transparent panel wall synthetic organic polymeric materials can also be employed, such as polymethyl methacrylate, other clear acrylic resins, polyvinyl chloride, CPVC, Mylar, polystyrene, polypropylene and polyesters and polyethers, to name only a few. Piping, pump and reservoir materials of construction may be any that are conventional in the art, including metals, glass, rubbers and plastics. The heat transfer fluid, while it may be a gas, such as air, nitrogen, carbon dioxide, argon or other such comparatively inert material, is preferably a liquid. Water may be employed but preferably anti-freeze materials, such as methanol or ethylene glycol, will be dissolved in it to lower its freezing point so as to avoid harm to the system during very cold weather. In this respect, the solar heat collectors being somewhat flexible, often may adapt to the freezing expansion of water therein without being damaged, but various auxiliary parts could suffer. Other liquids may be employed as heat transfer media, preferably being of lower vapor pressure than water so that they do not boil or vaporize significantly at the negative pressures and elevated temperatures inside the collector panels. Among suitable liquids that can be used are certain halogenated hydrocarbons, such as fluorinated lower hydrocarbons, e.g., suitable products sold under the trade name Freon ®, high temperature stable heat transfer liquids such as the Therminols ®, lower alkylene glycols, such as ethylene glycol, and high boiling hydrocarbons (preferably in liquid state). Of course, when the apparatus is employed to heat living spaces or water, indirect heat transfer from the heat transfer fluid to air or water will often be employed, but it is within the invention to heat air directly in the collector and discharge it into living spaces and similarly, water may be heated directly for use. When a heat transfer liquid is used it will preferably contain an anti-corrosion additive, such as an inhibitor or antioxidant, e.g., a rubber antioxidant of the amine type, a sequestrant, such as citric acid, NTA, EDTA, and an algaecide.

In preferred installations the heat collector panel is substantially flat and faces the sun, often at about a 45° to 60° angle and parallel to a roof top. Nevertheless, various shapes of panels may be employed such as arced or otherwise curved or angled. Such structures are also considered to be within the present invention. A negative pressure inside the solar heat collector panel may be created by pumping or siphoning, as illustrated in FIGS. 11 and 12, or by use of a vacuum pump or other means. Alternatively, a closed system may be employed, on which a vacuum has initially been drawn, which is maintained therein, with heat being indirectly transferred from a portion of the system to another fluid to be heated. The vacuum drawn will normally be at least 30 cm. of water, preferably at least 45 cm. thereof, equivalent to about 0.03 to 0.05 kg./sq. cm. and may be up to 0.7, even 0.9 kg./sq. cm. However, it is preferred that the vacuum be from 1 to 5 meters of water, corresponding to about 0.1 to 0.5 kg./sq. cm., more preferably about 2 to 4 meters of water.

The present solar heat collectors are superior to prior art devices in many significant ways. Because of the use of an internal vacuum the major surfaces of the collectors, or at least one thereof, are/is brought into excellent thermal contact with other conductive material to facilitate transfer of heat to circulating fluid in the collector. External air pressure constantly maintains such good contact because of the internal vacuum. The flexible wall member of the collector is thin and light weight, resulting in less weight on a support, such as roof, on which a bank of such collectors may be mounted. The heat transfer fluid content of the collector is similarly diminished, lessening weight on the support. The light weight of the panels (only about 0.3 to 1 kg./sq. m., e.g., 0.6 kg./sq. m.), the dew volume of liquid required and the absence of masses of pipes or coils keep the weight of the unit on the roof very low. The thin design also allows the use of relatively flat enclosures when the units are to be protected from the elements by being covered over with transparent coverings. The thin metal of the collector wall(s) facilitates conductive transfer of heat through it. The materials employed are readily available and inexpensive and, in the case of the discarded newspaper printing plates, require only to be cleaned of printing ink, and painted before or after fabrication. Due to the good heat transfer through it the heating panel has no objectionable hot spots, which can lead to heat losses and damage to the equipment. The turbulent flow of a thin stream of heat transfer fluid (liquid) in direct contact with the entire heat absorbing surface of the unit results in a high wet area ratio with the heat transfer medium. Consequently, the absorptive panel surface is at essentially the same temperature as the heat transfer medium flowing through the panel, resulting in less heat loss and greater operating efficiency. In a most cost-effective embodiment of the invention, with respect to manufacturing expense, only flat metal sheets of aluminum or similar materials are employed, possibly with aluminum wire screening as an internal spacer, so that manufacturing is very inexpensive.

Although the invention is primarily of a solar heat collector, the principle thereof, the utilization of an internal vacuum to promote improved thermal contact of heat absorbing and heat transferring parts by action of atmospheric pressure, can also be applied with respect to the manufacture of other heat transfer equipment, such as heat exchangers, radiators, radiation shields, such as those useful for protecting against infared radiation, heating panels, cooling panels and evaporator panels. The flexible material utilized may be flat or channeled, as illustrated, or of other such design, or may be supplied in tape form, suitable for wrapping around pipes, tanks or materials to be heated or cooled.

The invention has been described with respect to various illustrations and embodiments thereof but is not to be limited to these because it is evident that one of skill in the art, with this specification before him, will be able to utilize substitutes and equivalents without departing from the invention.

What is claimed is:

1. A solar heat collector which comprises a thin flexible first wall member, a second wall member conforming in shape to said first member, said members forming major walls of the solar heat collector and spaced apart from each other so as to form a plurality of passageways for flow therethrough of a heat transfer fluid, spacing material, having a plurality of open areas therein, between the first and second wall members to prevent the walls from pressing against each other so fully as to prevent circulation of a fluid through the passages, wherein the first wall member conforms in shape with the spacing material, having depressions matching the open areas thereof, so as to improve heat transfer fluid contact between them, diminish the volume of heat transfer fluid in the passages and rigidify the walls and the solar heat collector.

2. A solar heat collector according to claim 1 wherein the spacing material is a woven wire screen which is substantially planar and coextensive with the first and second wall members and matches depressions in both such members.

3. A solar heat collector according to claim 2 wherein the first wall member is a used printing plate of a thickness in the range of 0.1 to 0.4 mm. and the major surface of said wall which is faceable to the sun in the print side of such printing plate and is covered with a high temperature resistant black paint.

4. A solar heat collector according to claim 1 wherein the spacing material is of woven wire screen.

5. A solar heat collector according to claim 1 wherein the spacing material is of unwoven wire screen.

6. A solar heat collector according to claim 1 wherein the spacing material is of expanded metal.

7. A solar heat collector which comprises thin flexible first and second wall members of heat conductive metal and conforming flat panel shapes, which form the major walls of the solar heat collector and are spaced apart so as to form at least one passage for flow therethrough of a heat transfer fluid, said first wall member being pressed and moved in the direction of the second wall member and being held in place in the position to which it is moved by the difference in pressure between an external fluid pressure pressing against the first wall and an internal vacuum, the collector having at opposing ends thereof manifolds communicating with the passage between the walls, which walls are elsewhere sealed together so as to enclose the passage and prevent communication of heat transfer fluid therein with the atmosphere, and between the first and second walls, spacing material of a woven wire screen of heat conductive metal to prevent the walls from pressing against each other so fully as to prevent circulation of fluid from one manifold to the other through the passage, said woven wire screen being substantially planar and coextensive with the first and second wall members, and the wall members conforming in shape with the wire screen, having depressions at open areas between screen wires so as to improve heat transfer fluid contact with the wall members, diminish the volume of heat transfer fluid in the passage and rigidify the walls and the solar heat collector.

8. A solar heating installation comprising: a solar heat collector which includes a thin flexible first wall member, a second wall member conforming in shape to said first member, said members forming major walls of the solar heat collector and spaced apart from each other by a spacing material having a plurality of open areas so as to form at least one passageway for flow therethrough of a heat transfer fluid, said first wall member being such as to be held in position, pressed at least in part in the direction of the second wall member by external fluid pressure against the first wall member, which creates a pressure difference between the exterior of the first wall member and the passageway interior, said first wall member having depressions matching the open areas of the spacing material, facing said collector toward the sun and containing a heat transfer fluid under vacuum; and mechanical means, separate from the solar heat collector, for drawing a vacuum in the space between the first and second wall members of said collector, independently of flow of heat transfer fluid through the collector.

9. A solar heat collector installation according to claim 8 wherein one end thereof is vertically higher than an opposing end, the thin flexible first wall member is of a conductive metal and is pressed and moved in the direction of the second wall and held in place in the position to which it is moved by the difference in pressure between external air pressure and internal fluid vacuum and wherein the mechanical means for creating a vacuum in the interior of the solar heat collector, and for circulating heat transfer fluid therethrough, is a pump, the suction side of which is connected to the solar heat collector at the vertically higher end thereof so that the heat transfer fluid is drawn upwardly through the solar heat collector.

10. A solar heat collector installation according to claim 9 wherein the first wall member is a used printing plate of a thickness in the range of 0.1 to 0.4 mm. and the pressure difference is 0.1 to 0.5 kg./sq. cm.

11. A solar heat collector installation according to claim 10 wherein the used printing plate is of aluminum of a thickness of 0.2 to 0.3 mm. with the print side thereof covered with a high temperature resistant black paint and facing the sun.

12. A solar heat collector installation according to claim 9 wherein both first and second wall members are thin and flexible and of a heat conductive metal.

13. A solar heat collector installation according to claim 12 wherein the first and second walls are of flat panel shape having at opposing ends thereof manifolds communicating with the passage between the walls, which walls are elsewhere sealed together so as to enclose the passage and prevent communication of heat transfer fluid therein with the atmosphere and between the first and second walls spacing material is present to strengthen the collector and prevent the walls from pressing against each other so fully as to prevent circulation of fluid from one manifold to the other through the passageway.

14. A solar heat collector installation according to claim 13 wherein the spacing material is a woven wire screen of heat conductive metal.

15. A solar heat collector installation according to claim 14 wherein the first and second wall members are used printing plates of a thickness in the range of 0.1 to 0.4 mm. and the major surface of the wall facing to the sun is the print side of one such printing plate covered with a high temperature resistant black paint.

16. A solar heat collector installation according to claim 13 wherein the spacing material is an expanded heat conductive metal.

17. A solar heat collector installation according to claim 12 wherein the first and second walls are of panel shape having at least one of them so shaped as to produce a plurality of channels between the walls and wherein at opposing sides thereof a pair of manifolds communicates with the plurality of channels in such manner that heat transfer fluid may flow upwardly from one manifold to the other through said channels, the walls being elsewhere sealed together so as to enclose the channels and prevent communication of heat transfer fluid therein with the atmosphere.

18. A solar heat collector installation according to claim 17 wherein the first wall member is a used printing plate of a thickness in the range of 0.1 to 0.4 mm. with the print side thereof being covered with a high temperature resistant black paint and facing the sun and the pressure difference between the external air pressure and the internal vacuum of the collector being in the range of 0.1 to 0.5 kg./sq. cm.

19. A solar heat collector installation according to claim 8 which comprises means for circulating said heat transfer fluid through said collector.

20. A solar heat collector installation according to claim 19 wherein the means for circulating heat transfer fluid through the collector is a pump, the heat collector includes a manifold at each of two opposing ends thereof, one of which manifolds is higher vertically than the other, the pump is connected to a manifold of the solar heat collector by piping, and communicates with a reservoir for heat transfer fluid, the other manifold communicates with said reservoir and the vacuum applied to the heat transfer fluid in the solar heat collector is created by downstream flow under vacuum of heat transfer fluid from the solar heat collector.

21. A solar heating installation according to claim 20 wherein the one of the manifolds of the solar heat collector is located at the top thereof and another manifold is located at the bottom thereof and the pump communicates with the upper manifold and pumps water upwardly through the pipe and solar heat collector and out the upper manifold and at the same time thereby draws the vacuum on the upper manifold and the solar heat collector.

* * * * *